(12) United States Patent
Chiou et al.

(10) Patent No.: US 7,997,142 B2
(45) Date of Patent: Aug. 16, 2011

(54) LOW PRESSURE SENSOR DEVICE WITH HIGH ACCURACY AND HIGH SENSITIVITY

(75) Inventors: Jen-Huang Albert Chiou, Libertyville, IL (US); Shiuh-Hui Steven Chen, Lake Zurich, IL (US)

(73) Assignee: Continental Automotive Systems, Inc., Deer Park, IL (US)

( * ) Notice: Subject to any disclaimer, the term of this patent is extended or adjusted under 35 U.S.C. 154(b) by 117 days.

(21) Appl. No.: 12/534,009

(22) Filed: Jul. 31, 2009

(65) Prior Publication Data

US 2011/0023618 A1 Feb. 3, 2011

(51) Int. Cl.
*G01L 7/08* (2006.01)
(52) U.S. Cl. ....................................... 73/715
(58) Field of Classification Search ........................ None
See application file for complete search history.

(56) References Cited

U.S. PATENT DOCUMENTS

| | | | |
|---|---|---|---|
| 4,236,137 A | 11/1980 | Kurtz | |
| 4,949,581 A * | 8/1990 | Rud, Jr. | ............................ 73/706 |
| 5,022,270 A * | 6/1991 | Rud, Jr. | ............................ 73/706 |
| 5,156,052 A | 10/1992 | Johnson | |
| 5,178,016 A | 1/1993 | Dauenhauer | |
| 6,006,607 A | 12/1999 | Bryzek et al. | |
| 6,093,579 A | 7/2000 | Sathe | |
| 6,351,996 B1 * | 3/2002 | Nasiri et al. | .................... 73/706 |

OTHER PUBLICATIONS

M. Shimazoe, Y. Matsuoka, A. Yusakawa, M. Tanabe, "A special silicon Diaphragm Pressure Sensor with High Output and High Accuracy", Sensors & Actuators, 2 (1982) 275-282.
J. A. Chiou, "Simulations for Thermal Warpage and Pressure Nonlinearity of Monolithic CMOS Pressure Sensors", IEEE Trans. Adv. Packaging, vol. 26, pp. 327-333, 2003.
J. A. Chiou, S. Chen, "Thermal Hysteresis and Voltage Shift Analysis for Differential Pressure Sensors", Sensors and Actuators A: Physical, vol. 135, pp. 107-112, 2007.
J. A. Chiou, S. Chen, "Pressure Nonlinearity of Micromachined Piezoresistive Pressure Sensors with Thin Diaphragms under High Residual Stresses", Sensors and Actuators A: Physical, vol. 147, pp. 332-339., 2008.
ELMOS-SMI Pressure Sensor Device, ELMOS Semiconductor AG (MEMS Sensors) website, date unknown.

* cited by examiner

*Primary Examiner* — Andre Allen

(57) ABSTRACT

Pressure non-linearity in a low pressure sensor device formed from a silicon diaphragm with an embedded piezoresistive transducer is reduced by using a shallow boss or thin stiffener on an ultra-thin diaphragm while the pressure sensitivity of the device is increased with corner trenches.

26 Claims, 5 Drawing Sheets

LOW PRESSURE SENSOR DEVICE WITH HIGH ACCURACY AND HIGH SENSITIVITY

BACKGROUND

Solid state pressure sensors are well known. U.S. Pat. No. 4,236,137 to Kurtz, et al. discloses a semiconductor pressure transducer. U.S. Pat. No. 5,156,052 to Johnson, et al. also discloses a solid state pressure transducer. U.S. Pat. No. 6,006,607 to Bryzek, et al. discloses a pressure sensor that uses a piezoresistive device. U.S. Pat. Nos. 5,178,016 and 6,093,579 also discloses solid state pressure sensors.

A well-known problem with prior art pressure sensors that use piezoresistive devices formed into a thin silicon diaphragm is pressure non-linearity or PNL. The PNL is a function of the silicon diaphragm's deflection. The greater the diaphragm deflection, the greater degree of output non-linearity, whether the piezoresistance is detected and measured as a voltage or current.

Output non-linearity becomes more problematic in sensors that are intended to detect low pressures, e.g., pressures below 10 kPa. Since low pressure sensing devices require very thin silicon diaphragms, the diaphragm deflection in a thin diaphragm tends to aggravate the PNL in pressure sensors that are designed to measure low pressures. Another problem with thin silicon diaphragms is that they are fragile. A major challenge is to create a diaphragm to lower or reduce PNL while improving pressure sensitivity without increasing the die size for a low pressure sensor. A solid state piezoresistive pressure sensor that can be used at low pressures and which has an improved output linearity and which is more rugged and more sensitive than those in the prior art would be an improvement.

BRIEF SUMMARY

Embodiments of the invention are directed to a pressure sensor comprising: a silicon diaphragm (diaphragm) having a first thickness between about 1 and about 10 microns and having a piezoresistive element formed therein; and a diaphragm stiffener having a second thickness between about 1 and 20 microns, the diaphragm stiffener being attached to the diaphragm and located proximate to a center of the diaphragm. The diaphragm stiffener may have a second thickness between about 1 micron and about 10 microns. The diaphragm stiffener is surface micromachined. The stiffener may have an outer perimeter, and the diaphragm may be etched out and thinner in a plurality of regions that are distributed around the perimeter of the diaphragm. The diaphragm stiffener may be rectangular. The diaphragm stiffener may be square. The diaphragm stiffener is round. An etched-out region may be located at each corner of the stiffener. The pressure sensor may include a sidearm between each etched-out region. The etched-out region may be of a first thickness, the sidearm may be of a second thickness, and the stiffener may be of a third thickness. The first, second, and third thickness may be different from each other. The stiffener may be formed from the diaphragm. The stiffener may be formed from a material that is different from the diaphragm. The pressure sensor may include a housing having a recess. The pressure sensor may include at least one circuit formed in the silicon diaphragm and a passivation layer formed over the diaphragm.

Embodiments of the invention are directed to a method of forming a pressure sensor, the method comprising the steps of: forming a shallow gap on a first side of a first die, the shallow gap having a bottom surface; attaching a stiffener to the shallow gap bottom surface; forming a plurality of etched out regions around the stiffener; bonding the first die to a second die; thinning a second side of the first die to form a diaphragm; and forming a piezoresistive transducer on the second side of the first die. The plurality of etched out regions may have different thicknesses. The method may include the step of forming a hole through the second die. The step of forming a shallow gap and the step of thinning the second side may provide a diaphragm having a thickness between about 1 micron and about 200 microns. The step of forming a hole through the second die may include the step of forming the hole using deep reactive ion etching (DRIE).

Embodiments of the invention are directed to a method of forming a pressure sensor, the method comprising the steps of: forming a shallow gap on a first side of a first die, the shallow gap having a bottom surface and where the shallow gap is formed to provide a stiffener to the shallow gap bottom surface; forming a plurality of etched out regions around the stiffener; bonding the first die to a second die; thinning a second side of the first die; and forming a piezoresistive transducer on the second side of the first die. The plurality of etched out regions have different thicknesses. The method may include the step of forming a hole through the second die. The step of forming a shallow gap and the step of thinning the second side may provide a diaphragm having a thickness between about 1 micron and 20 microns. The step of forming a hole through the second die may include the step of forming the hole using deep reactive ion etching (DRIE). The step of attaching a stiffener may include the step of forming the stiffener from the first die by etching.

DETAILED DESCRIPTION

Figure 1:
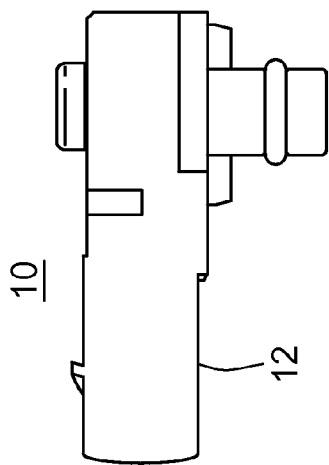
FIG. 1 and FIG. 2 are perspective views of a pressure sensor.
Figure 2:
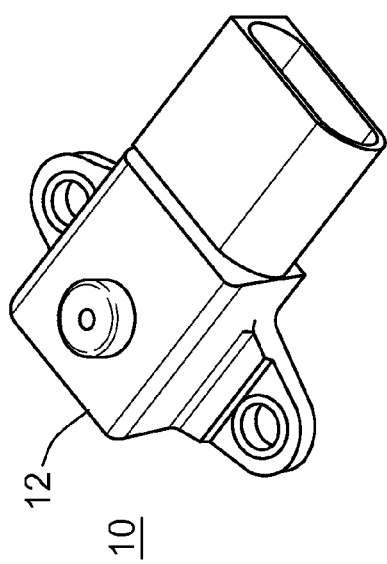
Figure 3:
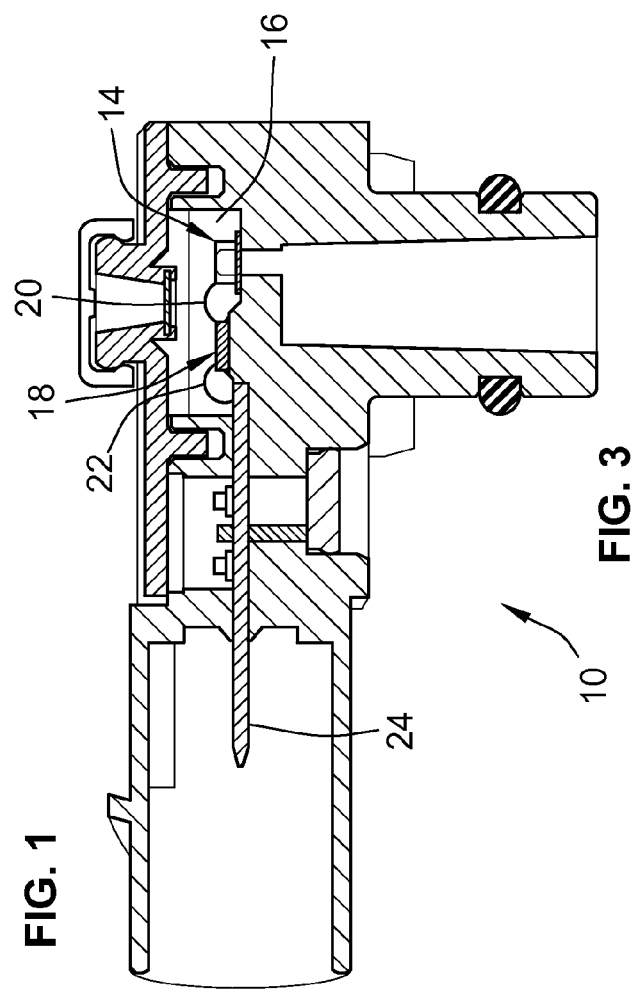
FIG. 3 is a cross-sectional view of the pressure sensor shown in FIG. 1 and FIG. 2.

FIG. 1 and FIG. 2 are different perspective views of a preferred embodiment of a pressure sensor 10 for use in automotive and industrial pressure sensing applications. FIG. 3 is a cross-sectional diagram of the pressure sensor 10 shown in FIG. 1 and FIG. 2. The sensor 10 shown in FIGS. 1, 2 and 3 includes a piezoresistive pressure sensor element, which is described below and which has a reduced PNL and improved pressure sensitivity through the use of a thin diaphragm that includes a surface-micro machined stiffener, also referred to herein as a "shallow boss." The sensor element described below is not shown in FIG. 1 or FIG. 2 as it is inside the housing 12. FIG. 3 however shows the relative location of the pressure sensor element 14 in the sensor 10.

The injection molded plastic housing 12 seals a diaphragm-type pressure sensor element 14 inside a cavity 16. An integrated circuit 18 that includes electronic devices to measure resistance changes of one or more piezoresistive devices in the sensor element 14, and generate an electrically measurable output signal in response thereto, is electrically connected to piezoresistive devices in the diaphragm of the pressure sensor element 14 via lead wires 20 that extend from the integrated circuit 18 to metal bond pads on the pressure sensor element 14. Power and ground connection wires 22 provide electrical current to the integrated circuit 18.

Electrical signals from the electronic devices inside the integrated circuit 18, and which represent deflection of the diaphragm in the pressure sensor element 14, are routed through the housing 12 through a signal lead frame 24 that extends into a shroud that surrounds signal and power lead frame 24.

As described below, the pressure sensor element 14 is formed of a thin, square or rectangular silicon diaphragm 36 having top and bottom surfaces or sides, a square being a special type of rectangle having four, equal-length sides and equal interior angles (90 degrees). One or more piezoresistive transducers 38 are formed into the diaphragm 36 near its peripheral edge using prior art techniques that are well known to those of ordinary skill. Deflection of the diaphragm in response to pressure applied to the diaphragm surfaces creates stress in a piezoresistive transducer, which causes its resistance to change. Resistance changes of the piezoelectric device are then converted to measurable electrical quantities by circuitry in the integrated circuit (IC) 18, i.e., voltage or current, to produce an electrical signal representative of pressure on the diaphragm.

Since the pressure sensor 10 is for sensing low pressures, the diaphragm thickness should be thin. In a preferred embodiment, the diaphragm thickness is nominally between about three (3) and about (5) microns (micrometers) however, alternate embodiments include diaphragms with thicknesses between one micron and about ten microns in order to enable the diaphragm to respond to pressures below 10 kPa. While a thin diaphragm enables the pressure sensor element 14 to respond to very low pressures, the use of such a thin diaphragm aggravates PNL. The inventors have overcome the increased PNL caused by a thin diaphragm by the use of a thin or "shallow" stiffener 34 applied to, or formed as part of the diaphragm 36 on the side of the diaphragm opposite the piezoresistive transducer 38. The stiffener 34 is also referred to herein as a "boss." The use of a thin stiffener, of a proper thickness, enables a thin diaphragm to be able to respond to low pressures without over-deflecting the diaphragm.

The thin stiffener 34 or "boss" is preferably formed as part of the diaphragm 36 during an etching process that forms the diaphragm itself. Surface micromachining, which is a well-known process of applying multiple layers to each other, one at a time, is optional but preferably used to properly "thin" the diaphragm 36 and form the stiffener 34. In an alternate embodiment, the stiffener 34 is formed separately and then attached to the diaphragm 36.

In a preferred embodiment, the diaphragm 36 is square or substantially square with a width and length of about seven hundred seventy microns. As shown in the figures, the stiffener 34 preferably has the same geometric shape as the diaphragm 36 and the center of the stiffener is located as close to the center of the diaphragm 36 as possible so that the diaphragm 36 is supported at its corners and so that the piezoresistive transducer 38 located on the center of the diaphragm edge is stressed by diaphragm deflections. In the preferred embodiment, the square stiffener had a width and length of about four hundred seventy microns and a thickness that can range from about one micron up to about twenty microns however a preferable range for the stiffener 34 is between about one micron and ten microns.

Figure 4:
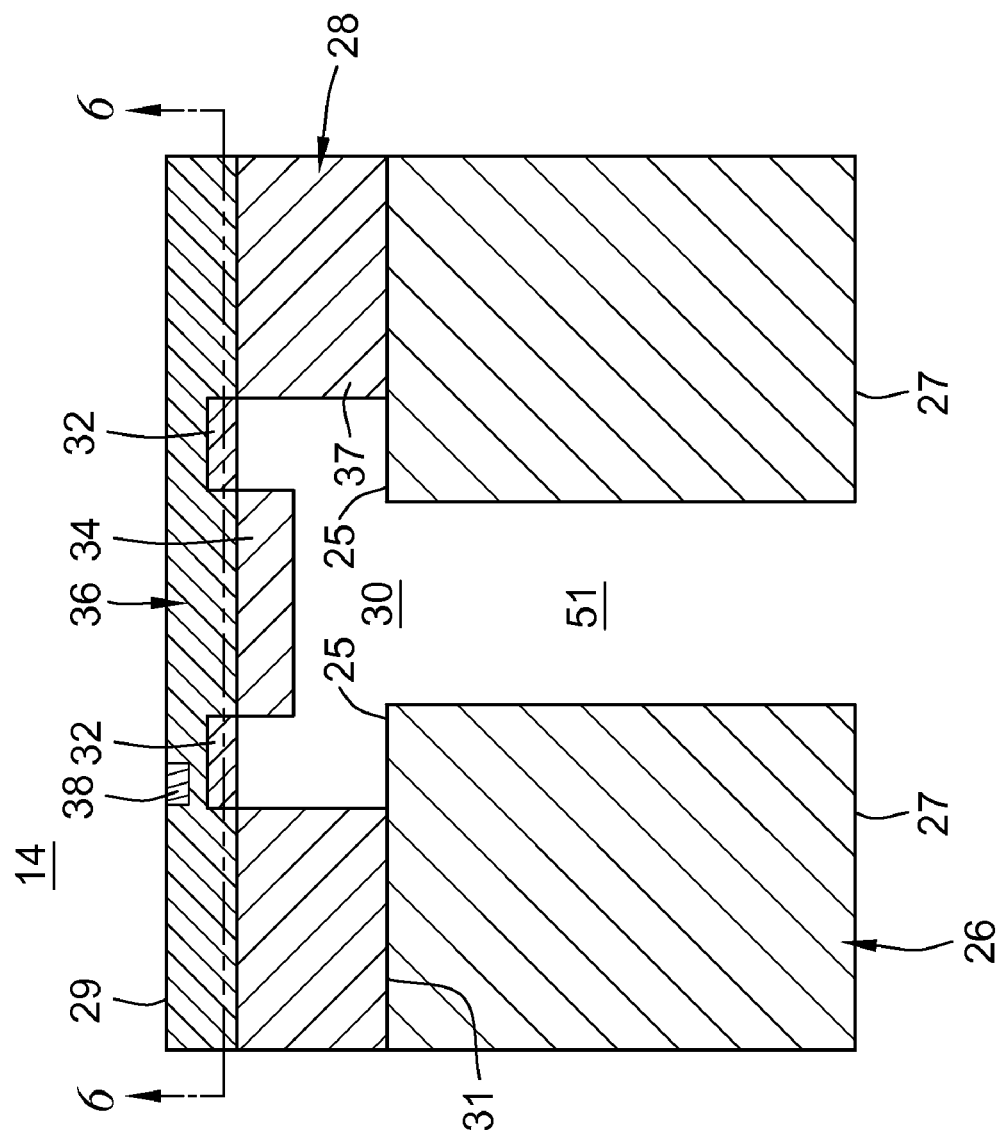
FIG. 4 is a cross-sectional view of a pressure sensor element used in the pressure sensor shown in FIGS. 1, 2 and 3.

FIG. 4 is a cross-sectional diagram of a pressure sensor element 14 configured for use in a pressure sensor, such as the one shown in FIGS. 1, 2 and 3. The pressure sensor element 14 is comprised of two layers of semiconductor material joined together by wafer bonding. The top layer, which is referred to herein as the device wafer, is formed to have the aforementioned thin diaphragm 36. When the diaphragm 36 deflects in response to pressure applied to it, the diaphragm deformation changes the resistance of the piezoresistive transducer 38. Resistance changes are measured electrically by devices (not shown) in the integrated circuit 18 to generate an output signal proportional to, or representative of the diaphragm deflection. The non-linearity of the piezoresistive element's resistance is reduced by the stiffener 34 on the opposite side of the diaphragm 36.

As can be seen in FIG. 4, the pressure sensor element 14 is comprised of a device layer 28 having a top surface 29 and a bottom surface 31 and a substrate layer 26 having a top surface 25 and a bottom surface 27. The substrate layer is preferably made of a single crystalline silicon.

Figure 7:
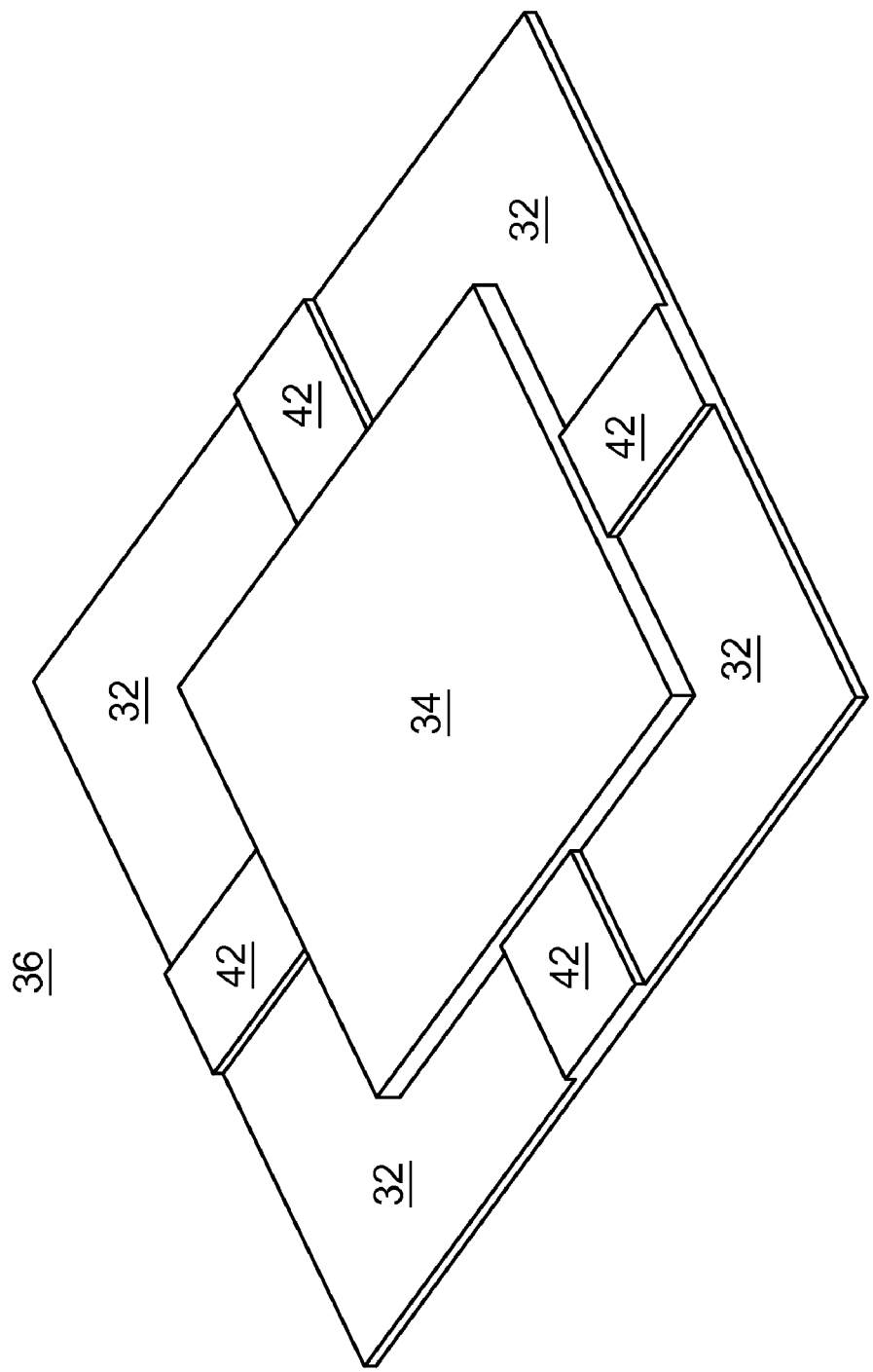
FIG. 7 is a perspective view of the bottom of the diaphragm of the pressure sensor element.

In FIG. 4, the device layer 28 has its own top and bottom surfaces 29 and 31 respectively and is formed of single crystalline silicon. The bottom surface 31 of the device layer 28 is etched out using any appropriate etching technique such as deep reactive ion etching (DRIE) to form a cavity 30 in the bottom surface 31. The cavity 30 is preferably square or rectangular but formed to have L-shaped corners 32 that are etched deeper and which are best seen in FIG. 7.

After the bottom surface 31 of the device wafer 28 is etched, the bottom surface 31 of the device wafer 28 is wafer-bonded to the top surface 25 of the substrate wafer 26. After the device wafer 28 is wafer-bonded to the substrate wafer 26, the top surface (identified in FIG. 8 by reference numeral 45) of the device wafer 28 is thinned using chemical-mechanical polishing or CMP to form a top surface 29 of the diaphragm 36. Thinning the device wafer 28 from its top surface (identified in FIG. 8 by reference numeral 45) produces a secondary or second top surface 29 shown in FIG. 4. The thickness of the device wafer 28 away from the cavity 30 after thinning, i.e., the distance between top surface 29 and bottom surface 31, is about 400 microns. The diaphragm is considered to be the material of the device wafer 28 that remains after CMP thinning and which is between the top surface 29 and the bottom surface of the stiffener or shallow boss 34. The distance between the top of the stiffener 34 and surface 29 defines the diaphragm's thickness. The thickness of the device wafer after the top surface is thinned to form surface 29 results in the formation of a thin diaphragm that will deflect in response to very low pressures applied to either side of the diaphragm.

The stiffener 34 described above can be formed during the DRIE process, in which case the stiffener and diaphragm are formed of the same material or the stiffener can be formed separately by either the same material as the diaphragm or a different material. Like the diaphragm 36, the stiffener 34 is also thin, i.e., preferably between two and about seven microns but preferably about four microns thick. As set forth above, the stiffener thickness can range from one to about ten microns.

As shown in the figures, the stiffener 34 does not extend all the way to the sidewalls 37 of the trench but is instead centered in the diaphragm. Despite the fact that the stiffener 34 extends only part way toward the sidewalls 37, the stiffener nevertheless reduces the deflection of a thin diaphragm and geometry non-linearity in response to an applied pressure and in so doing reduces the resistance non-linearity of a piezoresistive transducer 38 formed into the top surface 29 of the device layer 28. The stiffener is thus important to improving the linearity of the pressure sensor element 14, (or reducing PNL), the operating pressure range of which is determined by the thickness of the diaphragm 36.

Figure 5:
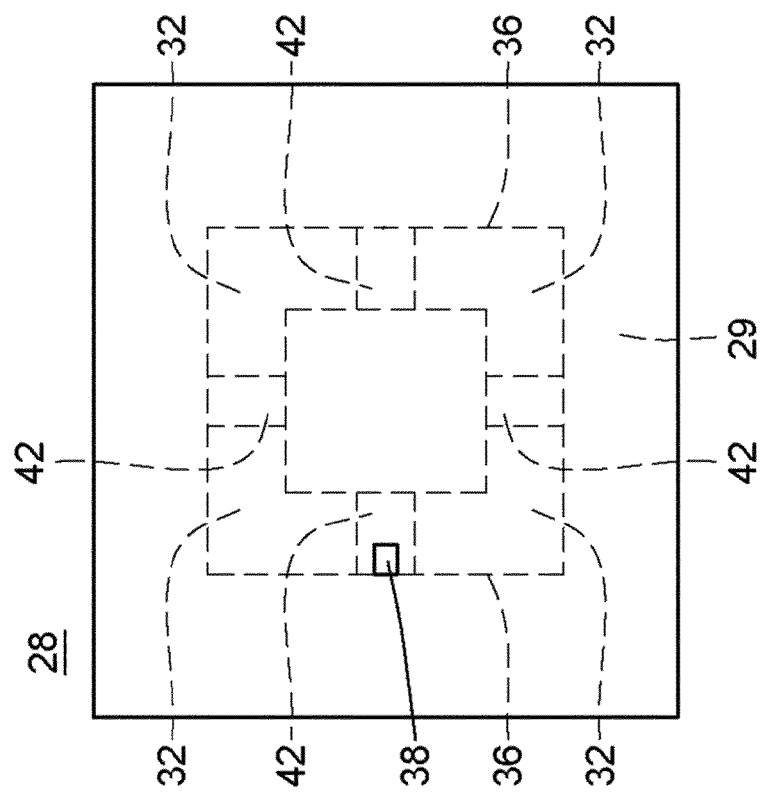
FIG. 5 is a top view of a pressure sensor element used in the pressure sensor shown in FIG. 3.

FIG. 5 is a top view of the pressure transducer 38 shown in cross section in FIG. 4. In this figure, the diaphragm 36 is clearly shown in dotted lines as a square portion of the top surface 29 of the device layer 28 and located at the geometric center of the diaphragm. The piezoresistive transducer 38 is formed near the center of one edge of the diaphragm 36.

Figure 6:
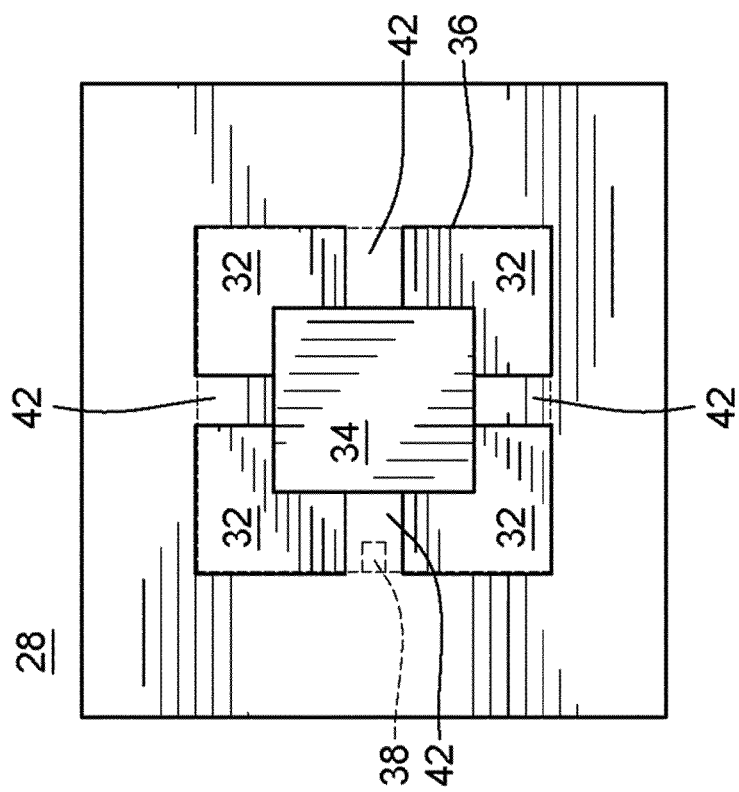
FIG. 6 is a bottom view of a pressure sensor element.

FIG. 6 is a bottom view of the device wafer 28. The thinned out corner regions or sections 32 are trenched, which are also shown as being separated from each other by the sidearms 42. As shown in FIG. 7, the side arms 42 are thicker than the corner sections 32. The stiffener 34 can therefore be considered to be additional material thickness, not part of the sidearms 42 and not part of the corners 32. By way of example, the sidearm 42 thickness could be 5 microns, the corner thickness 3 microns and the thickness of the stiffener 34, which is not part of the sidearms 42 and not part of the corners 32, could itself be 4, 5 or 6 microns.

FIG. 7 is a perspective view of the bottom of the diaphragm of the device wafer 28. In this figure, the stiffener 34 is shown as being formed as part of the diaphragm 36, as can be made to happen during an etching of the cavity 30. In an alternate embodiment, however, the stiffener 34 can be formed as a separate structure applied to the bottom of the diaphragm 36, such as surface micromaching.

Figure 8:
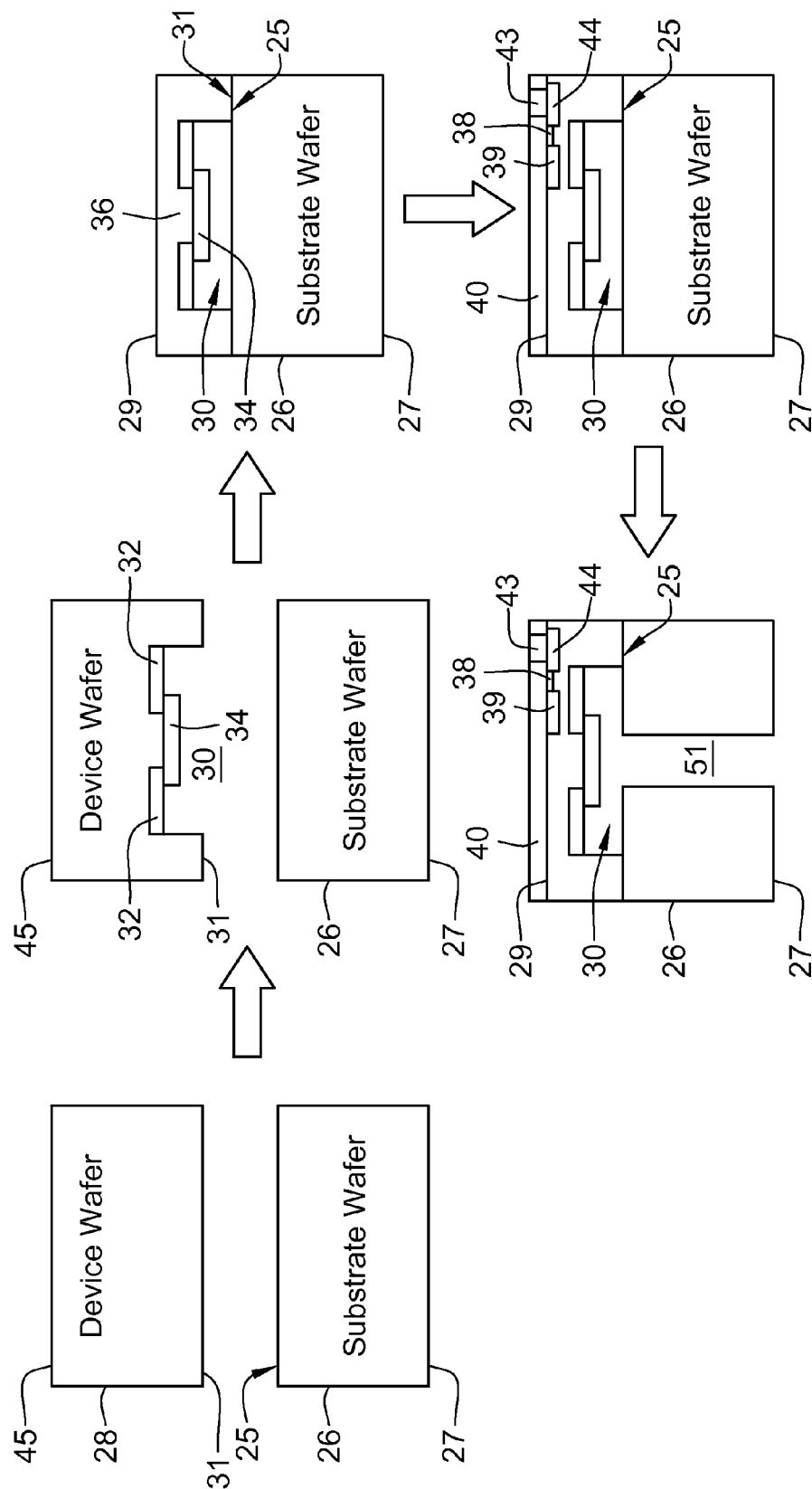
FIG. 8 shows steps of a process to form a pressure sensor element.

FIG. 8 shows steps of a process to form a pressure transducer application which has a high accuracy and high pressure sensitivity. The fabrication process starts with two separate semiconductor wafers identified in the figures above by reference numerals 26 and 28. As a second step, the bottom surface 31 of the device wafer 28 is etched to form a shallow cavity 30. A gap or cavity 30 is formed from the bottom side because the substrate wafer 26 is etched in a later step to form a through hole that extend all the way through the substrate wafer 26 and which allows fluid (gas or liquid) to impinge upon the back or bottom side of the diaphragm.

After the device wafer 28 and substrate wafer 26 are formed, the device wafer and substrate wafer are waferbonded to each other. Once the wafers are bonded to each other, the top surface 45 is thinned using a chemical-mechanical polishing (CMP) technique, the result of which is a secondary top surface 29.

Wafer-to-wafer-bonding provides a hermetic seal between them. The cavity 30, after enclosure by the wafer bonding of the substrate 26 to the device layer 28, isolates the cavity 30 from the outside world during the fabrication of circuits.

In a fourth step, circuits 39, which include the piezoresistive transducer 38 and a metal bond pad 43 for wire bonding and an interconnect 44 between the metal pad 43 and the piezoresistive transducer 38, are formed into the secondary top surface 29 of the thinned device wafer 28, using wellknown prior art techniques. Circuits in the secondary top surface 29 allow electrical connections to be made to the piezoresistive transducer 38 from an external integrated circuit. A passivation layer 40 is added over the secondary top surface 29 to protect the circuits 39.

In a final step, a through hole is formed all the way through the substrate wafer 26 from its bottom surface 27 to its top surface 25. The through hole 51 thus allows the pressure transducer 38 to operate as a differential transducer, which is to say that the resistance of the piezoresistive transducer 38 will change in response to a pressure difference between the pressure inside the cavity 30 and above the top surface 29.

The dimensions of the diaphragm and stiffener described above are important because they imbue the pressure sensor element 14 with characteristics not found in the prior art, namely the ability to measure low pressures with reduced PNL than would otherwise be possible using a thick diaphragm and/or a thick stiffener taught by the prior art.

As used herein, the diaphragm 36 is considered to be the portion of the device wafer 28 directly above the cavity 30. In a preferred embodiment the diaphragm thickness is between about 3 and about 5 microns. The diaphragm itself is preferably square having an edge-to-edge dimension of about 700 to 800 microns with a preferred embodiment being about 770 microns across.

The stiffener 34, which is also referred to herein as a boss, is also preferably square with a nominal width of about 400 microns. The corners 32 of the diaphragm are thinner and have a thickness of about 3 microns. Alternate embodiments of the stiffener can be rectangular, circular or elliptical, which are well-known geometric shapes and therefore omitted from the figures for brevity.

A hole 51 formed through the substrate wafer 26 is preferably formed using deep reactive ion etching or DRIE. The hole allows fluid (gas or liquid) to exert pressure against the bottom or backside of the diaphragm to provide a differential pressure sensor. The sidewalls of such a hole are nearly vertical. Alternate embodiments employ the use of other etching technologies.

As a final processing step, a passivation layer formed of silicone dioxide or silicone nitride is deposited over the secondary top surface 29 to protect the piezoresistive transducer 38 and other circuit elements 39 formed therein. Metal bond pads provide a conductive pathway to which the aforementioned connection wires 20 can be attached to the pressure transducer.

The foregoing description is for purposes of illustration only. The true scope of the invention is defined by the appurtenant claims.

What is claimed is:

1. A pressure sensor comprised of:
   a silicon diaphragm (diaphragm) having a first thickness between about 1 and about 10 microns and having a piezoresistive element formed therein; and
   a diaphragm stiffener having a second thickness between about 1 and 20 microns, the diaphragm stiffener being attached to the diaphragm and located proximate to a center of the diaphragm.

2. The pressure sensor of claim 1, wherein the diaphragm stiffener has a second thickness between about 1 micron and about 10 microns.

3. The pressure sensor of claim 1, wherein the diaphragm stiffener is surface-micromachined.

4. The pressure sensor of claim 1, wherein the stiffener has an outer perimeter and wherein the diaphragm is etched out and thinner in a plurality of regions that are distributed around the perimeter of the diaphragm.

5. The pressure sensor of claim 2, wherein the diaphragm stiffener is rectangular.

6. The pressure sensor of claim 2, wherein the diaphragm stiffener is square.

7. The pressure sensor of claim 2, wherein the diaphragm stiffener is round.

8. The pressure sensor of claim 3 or 4, wherein one etchedout region is located at each corner of the stiffener.

9. The pressure sensor of claim 8 further comprised of a sidearm between each etched-out region.

10. The pressure sensor of claim 9, wherein the etched-out region is of a first thickness, the sidearm is of a second thickness and the stiffener is of a third thickness.

11. The pressure sensor of claim 10, wherein the first, second and third thickness are different from each other.

12. The pressure sensor of claim 1, wherein the stiffener is formed from the diaphragm.

13. The pressure sensor of claim 1, wherein the stiffener is formed from a material that is different from the diaphragm.

14. The pressure sensor of claim 1, further including a housing having a recess.

15. The pressure sensor of claim 1, further including at least one circuit formed in the silicon diaphragm and a passivation layer formed over the diaphragm.

16. A method of forming a pressure sensor, the method comprising the steps of:
    forming a shallow gap on a first side of a first die, the shallow gap having a bottom surface;
    attaching a stiffener to the shallow gap bottom surface;
    forming a plurality of etched out regions around the stiffener;
    bonding the first die to a second die;
    thinning a second side of the first die to form a diaphragm; and
    forming a piezoresistive transducer on the second side of the first die.

17. The method of claim 16, wherein the plurality of etched out regions have different thicknesses.

18. The method of claim 16, further including the step of forming a hole through the second die.

19. The method of claim 16, wherein the step of forming a shallow gap and the step of thinning the second side provide a diaphragm having a thickness between about 1 micron and about 200 microns.

20. The method of claim 18, wherein the step of forming a hole through the second die includes the step of forming the hole using deep reactive ion etching (DRIE).

21. A method of forming a pressure sensor, the method comprising the steps of:
    forming a shallow gap on a first side of a first die, the shallow gap having a bottom surface and where the shallow gap is formed to provide a stiffener to the shallow gap bottom surface;
    forming a plurality of etched out regions around the stiffener;
    bonding the first die to a second die;
    thinning a second side of the first die; and
    forming a piezoresistive transducer on the second side of the first die.

22. The method of claim 21, wherein the plurality of etched out regions have different thicknesses.

23. The method of claim 21, including the step of forming a hole through the second die.

24. The method of claim 21 wherein the step of forming a shallow gap and the step of thinning the second side provide a diaphragm having a thickness between about 1 micron and 20 microns.

25. The method of claim 21, wherein the step of forming a hole through the second die includes the step of forming the hole using deep reactive ion etching (DRIE).

26. The method of claim 21, wherein the step of attaching a stiffener includes the step of forming the stiffener from the first die by etching.

* * * * *